(12) United States Patent
Sicard

(10) Patent No.: US 9,686,560 B2
(45) Date of Patent: Jun. 20, 2017

(54) LOSSLESS DATA COMPRESSION AND DECOMPRESSION APPARATUS, SYSTEM, AND METHOD

(71) Applicant: Teledyne DALSA, Inc., Thousand Oaks, CA (US)

(72) Inventor: Patrick Sicard, Saint-Eustache (CA)

(73) Assignee: TELEDYNE DALSA, INC., Thousand Oaks, CA (US)

( * ) Notice: Subject to any disclaimer, the term of this patent is extended or adjusted under 35 U.S.C. 154(b) by 0 days.

(21) Appl. No.: 14/629,140

(22) Filed: Feb. 23, 2015

(65) Prior Publication Data

US 2016/0249064 A1 Aug. 25, 2016

(51) Int. Cl.

| H04N 19/42 | (2014.01) |
|---|---|
| H04N 19/426 | (2014.01) |
| H04N 19/176 | (2014.01) |
| H04N 19/115 | (2014.01) |
| H04N 19/593 | (2014.01) |
| H04N 19/136 | (2014.01) |
| H04N 19/179 | (2014.01) |
| H04N 19/44 | (2014.01) |
| G06T 9/20 | (2006.01) |

(52) U.S. Cl.
CPC ............ *H04N 19/426* (2014.11); *G06T 9/20* (2013.01); *H04N 19/115* (2014.11); *H04N 19/136* (2014.11); *H04N 19/176* (2014.11); *H04N 19/179* (2014.11); *H04N 19/44* (2014.11); *H04N 19/593* (2014.11)

(58) Field of Classification Search
CPC ....... H03M 7/30; H04N 19/426; H04N 18/44; H04N 19/179; H04N 19/42; H04N 19/15; H04N 19/196; H04N 19/423; G06T 9/20; G06T 9/00
See application file for complete search history.

(56) References Cited

U.S. PATENT DOCUMENTS

| 6,404,927 B1 * | 6/2002 | Li | H03M 7/42 358/539 |
|---|---|---|---|
| 7,190,284 B1 * | 3/2007 | Dye | G06F 12/023 341/51 |

(Continued)

OTHER PUBLICATIONS

Extended European Search Report for European Application No. 16157030.4 mailed Jul. 27, 2016.

*Primary Examiner* — Jingge Wu
(74) *Attorney, Agent, or Firm* — K&L Gates LLP

(57) ABSTRACT

An apparatus for compressing a video image file is disclosed. The image file includes line segments having a length of M pixels of N bits and a header of H bits. Each pixel is represented by t bits. The apparatus includes a circuit configured to read a first number of unencoded pixel values in a first line segment and read a second number of unencoded pixel values of a second line segment are read. The first and second line segments preceded by a header of H bits and each pixel value is represented by t bits. The differences between each of the first and second unencoded pixel values is determined. The differences between each of the first and second unencoded pixel values encoded only using a smallest number of bits t for a given number of bits for each pixel value in the segment, wherein t is defined as an integer between 1 and N.

17 Claims, 7 Drawing Sheets

(56) References Cited

U.S. PATENT DOCUMENTS

| | | | | |
|---|---|---|---|---|
| 7,936,818 B2* | 5/2011 | Jayant | .................... | H04N 19/00 375/240.05 |
| 2001/0028746 A1* | 10/2001 | Kennedy | ............. | H04N 19/593 382/238 |
| 2001/0038642 A1* | 11/2001 | Alvarez, II | ............. | H03M 7/30 370/477 |
| 2005/0063596 A1* | 3/2005 | Yomdin | .................... | G06T 9/00 382/232 |
| 2005/0213812 A1 | 9/2005 | Ishikawa et al. | | |
| 2008/0112632 A1* | 5/2008 | Vos | .................... | G10L 19/0017 382/248 |
| 2009/0110312 A1* | 4/2009 | Sung | .................... | H04N 19/46 382/238 |
| 2009/0257485 A1* | 10/2009 | Youn | .................... | H04N 19/176 375/240.01 |
| 2009/0304070 A1* | 12/2009 | Lamy-Bergot | ..... | H04N 21/2383 375/240.02 |
| 2010/0128998 A1* | 5/2010 | Wegener | .................... | G06T 9/00 382/248 |
| 2010/0299454 A1 | 11/2010 | Lyashevsky | | |
| 2012/0219231 A1* | 8/2012 | Gharavi-Alkhansari | .......... | H04N 19/593 382/238 |
| 2013/0114709 A1* | 5/2013 | Shima | ................... | H04N 19/176 375/240.12 |
| 2013/0266235 A1* | 10/2013 | Shima | .................... | G06T 9/004 382/238 |
| 2013/0272388 A1* | 10/2013 | Shima | ................ | H04N 19/0009 375/240.03 |

* cited by examiner

LOSSLESS DATA COMPRESSION AND DECOMPRESSION APPARATUS, SYSTEM, AND METHOD

FIELD OF TECHNOLOGY

The present disclosure is related generally to the technology of compression and decompression of digital data, and more specifically to the technology of compression and decompression of image data, and still more specifically to the technology of compression and decompression of image data by a lossless compression and decompression techniques.

BACKGROUND

The present technology of compressing and decompressing data may be employed for various equipment units in various fields, and is used in, for example, video cameras. Certain video cameras offer a wide variety of resolutions and speeds to accommodate many applications. Video cameras work over many protocols including TCP (Transmission Control Protocol) /IP (Internet Protocol), HTTP (Hypertext Transfer Protocol), UDP (User Datagram Protocol), ICMP (Internet Control Message Protocol), ARP (Address Resolution Protocol), DHCP (Dynamic Host Configuration Protocol), NTP (Network Time Protocol), RTP (Real Time Transport Protocol), RTSP (Real Time Streaming Protocol), RTCP (Real Time Control Protocol), SMTP (Simple Mail Transfer Protocol), IGMP (Internet Group Management Protocol), UPnP (Universal Plug and Play), for example, and are power over Ethernet (PoE, IEEE 802.3af) capable.

Such video cameras may employ various video compression techniques such as motion JPEG (Joint Photographic Experts Group) with multiple compression levels, MPEG (Moving Picture Experts Group) with SP (Service Pack) (Level 3), ASP (Active Server Pages) (Level 5), H.264 (MPEG4 AVC (Advanced Video Coding) such as baseline (Level 3). Such cameras may employ various video streaming techniques such as simultaneous dual encoding for MJPEG (Motion Joint Photographic Experts Group) and MPEG4 or H.264, multistreaming for MJPEG, VBR (Variable Bitrate) and CBR (Constant Bitrate) for MPEG4 and H.264, multicast and unicast. Other lossless compression algorithms, such as lossless JPEG, are difficult to implement in FPGA (Field Programmable Gate Array), or take too much resource in FPGA.

While several image data compression and decompression algorithms have been made and used, it is believed that no one prior to the inventors has made or used the image data compression and decompression algorithms described in the appended claims.

SUMMARY

The following variables are used throughout the present disclosure to simplify the description thereof:

N: Number of bits per pixel of original image

M: Number of pixels in each segment of a plurality of segments

H: Number of bits composing the header of each segment (H=T+E)

T: Number of bits required to represent all the possible number of bits of difference between two original pixels E: Number of bits to encode additional information in each header segment (H)

t: Value read in T that represent the number of bits per pixel in the current segment In one aspect, the present disclosure provides a method of compressing a video image file, the image file comprising a plurality of line segments, each line segment having a length of M pixels and a header of H bits, where H=T+E bits, and each pixel is represented by t bits, the method comprising: reading, from an unencoded image file, a first number of unencoded pixel values in a first line segment having a first segment length M pixels; reading, from the unencoded image file, a second number of unencoded pixel values of a second line segment having a second length M, and each of the pixel values is represented by N bits; determining the differences between each of the first and second unencoded pixel values; and encoding only the differences between each of the first and second unencoded pixel values using a smallest number of bits t for a given number of bits for each pixel value in the segment, wherein t is defined as an integer between 1 and N.

In another aspect, the method comprises assigning a predetermined number bits of the header of the second segment to represent the number of bits t required to encode the segment differences between the first and second line segments.

In another aspect, the method comprises determining the minimum and the maximum differences between each of the first and second pixel values in the second line segment.

In another aspect, the method comprises determining the worst difference values that both fit in a signed number of 1 to (N−1) bits otherwise writing a real value of N bits for each pixel value instead of the differences between each of the first and second pixel values.

In another aspect, the method comprises interpreting the first and second pixel values as a signed number.

In another aspect, the method comprises truncating the differences between each of the first and second pixel values to N bits.

In another aspect, the method comprises outputting the header followed by the differences between each of the first and second pixel values using x bits so the total number of bits used is given by the relationship: H+M*t.

In another aspect, the method comprises defining an offset using the remaining E (E=H−T) bits of the header; and reducing the smallest number of bits t for a given number of bits for each pixel value in the segment.

In another aspect, the method comprises employing the remaining E bits of the header when the t value is set to no difference (t=0); and encoding two half-length (M/2) segments.

In another aspect, the method comprises using the last unused header value for other compression schemes.

In one aspect, the present disclosure provides a method of encoding an image file having a line segment length M, the line segment comprising a plurality of pixel values, the method comprising: for each pixel value of in a current line segment, calculating a difference between a pixel value in a current line segment and a pixel value in a precedent line segment; determining a minimum difference for the current line segment; determining a maximum difference for the current line segment; calculating a number of bits required to represent signed values between the minimum difference and the maximum difference; and outputting the M differences for the current line segment at the calculated number of bits t per difference pixel value.

In another aspect, the method comprises calculating a common offset to minimize absolute values of minimum difference and the maximum difference.

In another aspect, the method comprises determining the common offset according to the relationship: Offset=−((MinDiff+MaxDiff+1)/2); where MinDiff represents the minimum difference; and where MaxDiff represents the maximum difference.

In another aspect, the method comprises updating the minimum difference and the maximum difference according to the relationship: MinDiff=MinDiff+Offset; and MaxDiff=MaxDiff+Offset.

In another aspect, the method comprises outputting a segment header, where the segment header comprises the calculated number of bits required to represent signed values between the minimum difference and the maximum difference and an offset value.

In another aspect, the method comprises outputting the M original pixel values when the line segment is line 0 or when the calculated number of bits required to represent signed values between the minimum difference and the maximum difference is equal to the full number of bits used to represent the pixel value.

In one aspect, the present disclosure provides a method of decoding a line segment of an image file having a line segment encoded with base encoding and offset, the line segment comprising M pixel values, the method comprises reading a header of a line segment, wherein the header where the segment header comprises a number of bits required to represent signed values of a minimum difference and a maximum difference between a pixel value in a current line segment and a pixel value in a precedent line segment and an offset value.

In another aspect, the method comprises determining a number of bits required to represent the signed values of a minimum difference and a maximum difference between a pixel value in a current line segment and a pixel value in a precedent line segment is equal to the full number of bits used to represent the pixel value; and outputting the original M pixel values to an output image when the number of bits is equal to the full number of bits used to represent the pixel value.

In another aspect, the method comprises reading decoded pixel values of a preceding line segment from an output image; and reading the M differences between the current line segment and the preceding line segment.

In another aspect, the method comprises determining a decoded pixel value for each pixel value of the current line segment according to the relationship: decoded pixel value=LastLinePixel−Offset+Diff; where LastLinePixel is the already decoded pixel value of the preceding line segment from the output image; where Offset is the difference between absolute values of a minimum difference and a maximum difference between pixel values in a current line segment and pixel values in a preceding line segment; and where Diff is the difference between pixel values in a current line segment and pixel values in a preceding line segment; and copying the M decoded pixel values to the output image.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to effect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features of the embodiments described herein are set forth with particularity in the appended claims. The embodiments, however, both as to organization and methods of operation may be better understood by reference to the following description, taken in conjunction with the accompanying drawings as follows.

DETAILED DESCRIPTION

Figure 1:
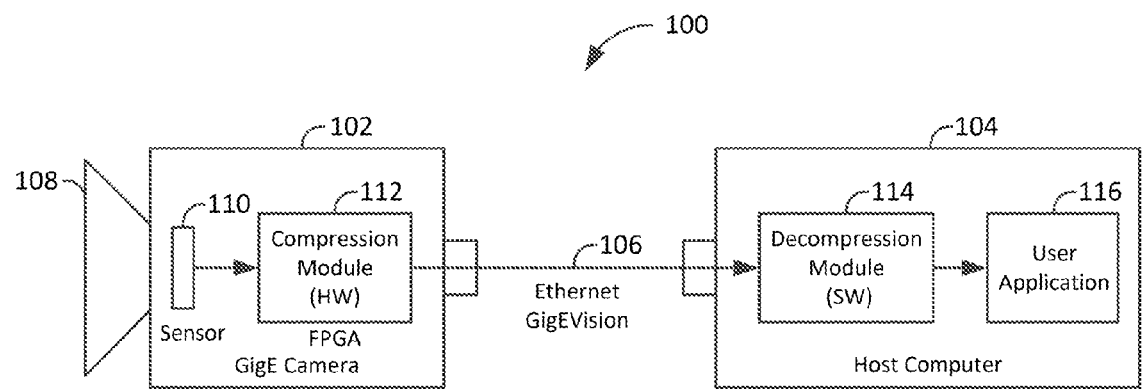
FIG. 1 is a diagram of a system including a vision camera for acquiring and compressing image data and communicating the compressed image data to a host computer for decompressing the image data, according to one embodiment.

In the following detailed description, reference is made to the accompanying drawings, which form a part hereof. In the drawings, similar symbols and reference characters typically identify similar components throughout the several views, unless context dictates otherwise. The illustrative embodiments described in the detailed description, drawings, and claims are not meant to be limiting. Other embodiments may be utilized, and other changes may be made, without departing from the scope of the subject matter presented here.

Before explaining the various embodiments of image data compression and decompression techniques in detail, it should be noted that the various embodiments disclosed herein are not limited in their application or use to the details of construction and arrangement of parts illustrated in the accompanying drawings and description. Rather, the disclosed embodiments may be positioned or incorporated in other embodiments, variations and modifications thereof, and may be practiced or carried out in various ways. Accordingly, embodiments of image data compression and decompression techniques disclosed herein are illustrative in nature and are not meant to limit the scope or application thereof. Furthermore, unless otherwise indicated, the terms and expressions employed herein have been chosen for the purpose of describing the embodiments for the convenience of the reader and are not to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Also, in the following description, it is to be understood that terms such as front, back, inside, outside, top, bottom and the like are words of convenience and are not to be construed as limiting terms. Terminology used herein is not meant to be limiting insofar as devices described herein, or portions thereof, may be attached or utilized in other orientations. The various embodiments will be described in more detail with reference to the drawings.

The present disclosure is directed generally to various aspects of lossless image data compression/decompression techniques to augment the average quantity of image data to be transported in a lossless manner, such as gigabit Ethernet connection, to increase the bandwidth thereof.

Prior to describing the present lossless image data compression/decompression processes in detail, the description turns to FIG. 1, which depicts a diagram of a system 100 including a vision camera 102 configured to acquire and compress image data and communicating a compressed image data file to a host computer 104, which is configured to decompress the received compressed image data file, according to one embodiment, and provides the decompressed image data file to a user application 116.

The vision camera 102 comprises an aperture 108 to receive an optical image. An image sensor 110 converts the optical image into an electronic signal and output an image data file. The image data file may be in one of any known image data file formats. The image sensor 110 may be comprise charge coupled device (CCD) or active pixel sensors in complementary metal-oxide-semiconductor (CMOS) or N-type metal-oxide-semiconductor (NMOS, Live MOS) technologies. The image data file from the image sensor 110 is provided to a compression module 112. The compression module 112 compresses the image data file in a lossless manner. In various embodiments, the compression module 112 may be implemented either in hardware, software, or a combination thereof. In a hardware implementation, the compression module 112 may be implemented as a logic circuit in a field programmable gate array (FPGA), for example, for its ease of implementation on FPGA. In one example, the vision camera 102 may be a GigE Camera. A GigE Camera is a digital camera equipped with a Gigabit Ethernet (GigE) Vision interface standard introduced in 2006 for high-performance industrial cameras. It provides a framework for transmitting high-speed video and related control data over Ethernet networks. It will be appreciated that the compression module 112 may be employed in other digital vision cameras, without limitation. Thus, the compression module 112 may be embedded in a machine vision GigE camera and the compressed may be transferred on a Gigabit Ethernet Link.

The compressed image data file produced by the compression module 112 is communicated to the host computer 104 over an interface 106. In one embodiment, the interface 106 may be the Ethernet GigE Vision interface previously mentioned. The GigE Vision standard defines the process by which the host computer 104 machine can discover, control, and acquire images from one or more GigE Vision cameras 102. The GigE data transmission standard is based on the IEEE 802.3 protocol. This standard is the next step in the Ethernet and Fast Ethernet standards that are widely used today. While Ethernet and Fast Ethernet are limited to 10 Mb/s and 100 Mb/s; respectively, the GigE standard allows transmission of up to 1000 Mb/s (or about 125 MB/s). A wide variety of cabling technology including, CAT 5e/6, fiber optic, and wireless may be used for the GigE Vision interface 106.

The host computer 104 is configured to receive the compressed image data file transmitted by the vision camera 102 over the interface 106. A decompression module 114 decompresses the received image data file and provides the decompressed image data file to a user application 116. In accordance with the present disclosure, the decompression module 114 may be implemented in hardware, software, or a combination thereof. In the illustrated example, the decompression module 114 is implemented in software.

In one embodiment, a lossless image data compression process compresses an image by using precedent line pixels and encoding only the differences from the precedent line pixels using the smallest number of bits for a given number of pixels (segment length) needed to represent the difference. This is referred as the base encoding scheme. For example, when implemented for 8-bit monochrome images, only 3 bits are used in a header byte to select the number of bits of difference per pixel. When, the number of bits required to select the number of bits of difference per pixel would be a predetermined number of bits, then the real value of the pixels are passed instead of a difference from the precedent line. A first extension (Extension 1), employs the remaining 5 bits of the header to make an offset of 5-bit before that translates to a reduced bit requirement for differences in some cases. A second extension (Extension 2) employs the same 5 bits when the 3-bit is set to "Full Bytes," (would copy directly the byte pixels if the 5-bit value is 0 and encodes two half-length segments. A third extension (Extension 3) takes the last unused header byte value for other compression schemes that would compress more than the others extensions or base, using 1 or more additional header bytes. These image data compression techniques are described in more detail hereinbelow.

The lossless image data compression algorithm according to the present disclosure can be easily implemented in software, hardware, or combination thereof, and easy to decode on a host computer. Compared to the JPEG algorithm, which is very resource demanding, the present algorithm can be implemented in hardware using much fewer resources.

The algorithm comprises a base encoding (Base) algorithm that can be augmented with extensions that further compress the data, while maintaining compatibility on the decoding side (computer, as long as all the extensions are supported). The second extension is "Halved segments encoded in 5-bit." The third extension is for expansion using 1 or more additional header bytes to describe new encoding scheme that could compress more than the other ones in certain conditions.

Only the monochrome 8-bit per pixel encoding technique is described in the present disclosure. Nevertheless, the present encoding technique can extrapolated for use with true color, more than 8-bit, or even a Bayer pattern input.

The data is compressed by segments of 32 pixels. Each line is be aligned to Width pixels so if the Width is not a multiple of 32 pixels, the decoder employs the image width to know which byte is the last of the last segment of the line.

Each segment is preceded by a header byte. In a worst case scenario, the resulting encoding will use 1/32=3.125% more space than an original uncompressed image. The resulting size may be higher than the original when artificial noise replaces many pixels in the original image that increases the maximum difference found between two segment pixels. Otherwise, in substantially all situations the encoding will result in a size that is less than the original.

Base Encoding

A description of the base encoding technique will now follow. Each segment of 32 pixels requires a header byte. The first lowest 3 bits (0, 1, 2) of the header byte represent the number of bits (numBitsPerPixelDiff) required to encode the segment differences (DIFFs) between the current line and the precedent line. The highest 5 remaining bits of the header byte are unused in the base encoding scheme but they are set to zero for compatibility with the extensions (at decode time).

To determine the number of bits required to encode the pixels, the minimum and the maximum DIFFs of each of the 32 pixels in the segment is determined. Subsequently, it is determined if the worst DIFFs values both fit in a signed number of 1 to 7 bits. Else, a real value of 8-bit will be written for each pixel instead of a difference (DIFF) from the previous line. Note that the pixel byte values are interpreted as a signed number. Then the DIFFs are truncated to 8-bit. This technique enables a DIFF of 255 to be treated as −1 where the worst minimums and maximums range from −128 to +127.

An example base encoding technique to determine the number of bits (numBitsPerPixelDiff) required to encode the segment differences from the precedent line (DIFFs) may be implemented as follows:

if ((minDiff>=−1) && (maxDiff<=0))
    numBitsPerPixelDiff=1;
    else if ((minDiff>=−2) && (maxDiff<=1))
    numBitsPerPixelDiff=2;
    else if ((minDiff>=−4) && (maxDiff<=3))
    numBitsPerPixelDiff=3;
    else if ((minDiff>=−8) && (maxDiff<=7))
    numBitsPerPixelDiff=4;
    else if ((minDiff>=−16) && (maxDiff<=15))
    numBitsPerPixelDiff=5;
    else if ((minDiff>=−32) && (maxDiff<=31))
    numBitsPerPixelDiff=6;
    else if ((minDiff>=−64) && (maxDiff<=63))
    numBitsPerPixelDiff=7;
    else numBitsPerPixelDiff=8;
    segmentType=numBitsPerPixelDiff & 7 //8 wraps around to 0 in 3-bit scheme.

Another technique for calculating the number of bits (numBitsPerPixelDiff) required to encode the segment differences from the precedent line (DIFFs) in hardware, assuming signed minDiff and maxDiff, may be implemented as follows:

tempVal=((minDiff XOR (minDiff>>7)) OR (maxDiff XOR (maxDiff>>7)));
    Type=9−(number if 0 bits in tempVal starting from highest bit);
    if (Type==0)
    Type=1;
    Type &=7 //Truncates to 3 lowest bits, so 8 becomes 0.

Following the header byte, the DIFFs are outputted packed using numBitsPerPixelDiff per pixel. For example, if the minimum difference minDiff=−5 and the maximum difference is maxDiff=16, the numBitsPerPixelDiff will be 6. The header will be followed by each pixel DIFFs using 6-bit so the total number of bytes used is given by the following relationship:

1 (header)+32*6/8=25

Note that 25 bytes is almost 22% less data than a non-compressed original of 32 bytes.

All segments of the first line are encoded with numBitsPerPixelDiff=0 (original 8-bit pixels).

If the line width is not a multiple of 32 pixels, then the hardware must not send a complete segment, only enough bytes for the number of pixel required. At decode time, this segment will be processed differently since the image width is known.

First Extension (Extension 1)

The first extension (Extension 1) employs the remaining 5 bits of the header to define a 5-bit offset before that translates to a reduced bit requirement for differences in some cases. Since the 5 highest bits of the header are unused, this extension will make use of them to try to use a smaller count of bits per pixel for the encoding.

In the preceding example, the minDiff is −5 and the maxDiff is 16. Therefore, encoding just the minDiff would require only 4 bits while encoding the maxDiff alone would require 6 bits. In one aspect, the present compression technique applies a signed offset of 5-bit (ranging from −16 to 15) before determining the number of bits required for encoding the differences (DIFFs). In the preceding example, the DIFFs may be offset by −6. Then the new minDiff is −11 and the new maxDiff is 10. Both those numbers fit in a 5-bit encoding scheme and thus provides an economization of 1-bit per pixel for each of the 32 pixels in the segment, which is 4 bytes. In practice, it was determined that an average of 3% of the non-compressed image size economized. Therefore, if a compressed image was using 75% of the space of the non-compressed image, it would now use 72%.

One example technique for calculating the offset and updating the minimum and maximum differences minDiff and maxDiff may be implemented as follows:

offset=−((maxDiff+minDiff+1)>>1); // Signed right-shift
    if (offset<−16)
    offset=−16;
    else if (offset>15)
    offset=15;
    maxDiff+=offset;
    minDiff+=offset.

Note that all DIFFs will have to be updated this way (DIFF+=offset).

Second Extension (Extension 2)

After the first extension, a second extension (Extension 2) may be used which employs the same 5 bits when the 3-bit is set to "Full Bytes," and encodes two half-length segments. Thus, when the Encoding Type is not set to "Full Bytes," the remaining 5 bits are set to 0. These bits will then be used when the second extension provides better compression than the base encoding with the first extension (Base+Ext1) technique described above.

Similar to the base encoding technique, the second extension technique determines the maximum and minimum differences from the precedent line (DIFFs), except for two sub-segments (halves), containing the first 16 pixels and the last 16 pixels. The number of bits required to encode each sub-segment will first be calculated and then it will be determined if second extension technique can be used with the limitations that the encoding type is set to 3 to 8 bits per pixel.

If the two encoding types are equal, the process will not be repeated in the second extension since it is already handled by the base encoding technique. If the sum of the two encoding types is greater or equal to the encoding type from the Base+Ext1 technique, for conciseness and clarity of disclosure the process also will not be repeated in the description of the second extension. Accordingly, there are 30 different combinations of encoding types that can be allocated in the 5-bit subSegmentTypes.

In practice, it has been determined that between 1% and 5% additional compression is done relative to the non-compressed image size. In images that have many segments containing only portions of great differences, the gain will be larger. The less an image is compressed with Base+Ext1, the more potential there is to gain compression with Ext2. For example, an image compressed with Base+Ext1 at 78.1% can be further compressed to 73.5% with Base+Ext1+Ext2, while another image starting at 44.6% can be further compressed to 43.6% with Ext2. The embodiments, however, are not limited in this context.

Another technique for calculating the sub-segments encoding types (subSegmentType0 and subSegmentType1) will now be described. Accordingly, the full header of 8-bit (segmentHeader) may be implemented as follows:

if (subSegmentType0<3)
    subSegmentType0=3;
    if (subSegmentType1<3)
    subSegmentType1=3;
    if ((subSegmentType0+subSegmentType1)<(2*segmentType))
    {
    if (subSegment0==8)
       subSegmentTypes=((subSegmentType1−3)*7)+1;
    Else
       subSegmentTypes=((subSegmentType0−3)*6)+subSegmentType1−2;
    segmentHeader=subSegmentTypes<<3;
    }

Note that Base and Ext1 already have calculated a good and/or better encoding.

Third Extension (Extension 3)

In accordance with the second extension technique, the process uses almost all remaining headers possible except one: value 31 in the highest 5-bit and 0 in the lowest 3-bit. This case will be used for expansion to a second header byte, which will be used to describe new extensions. Additional extensions from the Third Extension are referenced herein as 3.x, where x is the number of each new extension.

Extension 3.1 (2nd header=0x00)

Extension 3.1 is used when there are no segment differences DIFFs between the current line and the precedent line, so the compressed size will be set to 2/32=6.25%. This extension may be employed anytime, but mostly when encoding the highest part of greater than 8-bit pixels since those will have 1 to 4 bits to use the same code as the low 8-bit part.

Extension 3.2 (2nd header=0x01)

Extension 3.2 repeats one byte 32 times to yield a compressed size of 3/32=9.375%. This extension may employed when a part of the image is white blasted.

Extension 3.3 (2nd header=0x02)

Extension 3.3 is the same as extension 3.2, but for the zero value and will yield a compressed size of 2/32=6.25%. Extension 3.3 may be employed for the highest part of the more than 8-bit per pixel formats (in the case of monochrome 12-bit pixels, the compressed size of the highest 4 bits would be 2/16=12.5% since the maximum number of bits to encode is only 4).

Extension 3.4 (2nd header=0x03)

Extension 3.4 is useful to address the case of patterned sensors, like the Bayer pattern. Following the second header will be two halved segments, each containing respectively the difference of even pixels (0, 2, 4, . . . ) and odd pixels (1, 3, 5, . . . ) of the original pixels positions. It will reach better reduction if the sum of the bits needed for the two halve segments is less than the original bits per pixel times 2 minus 1. For example, for 7 bits in the original segment: a sum less than 13 (7*2−1) bits for the even and odd halved-segments (6 and 6, or 7 and 5, or else). The encoded bytes would be 1st header+2nd header+3rd header+16 even pixel differences+4th header+16 odd pixel differences.

Extension 3.5 (2nd header=0x08 to 0x0F)

Extension 3.5 is the same as Base+Ext1 but with a 8-bit offset instead of 5-bit. Of course, we use two more bytes but anything less than 4 more bytes will reach a better compression if the number of bits per pixel diff is smaller than in the other case (Base+Ext1). One reason for extension 3.5 is that it is very easy to add as it is a subset of the Base+Ext1, just before the offset is topped off or bottomed off to 5-bit. The second header will have the 3 lowest bits set like in the Base case (if 5-bit offset would be used), and the 4th bit set to 1; 5th to 8th bits remain 0 The encoded bytes will be 1st header+2nd header+one 8-bit offset+32 pixel differences.

Pixel Formats

The compression technique, algorithm, or process so far has been described in the context of 8-bit monochrome. To be able to encode more than 8-bit, the compression technique, algorithm, or process described herein can be employed for different parts of a pixel. For each segment, the encoder will first have to split the data into different parts. This way, the encoder can be stay as simple as it is, mainly when implemented in hardware.

Monochrome Images

In the case of larger than 8-bit monochrome pixel, the first part will be the lowest 8 bits of each pixel, and the second will be the highest 4 bits of the same pixels. The extension 3.1 may then be employed for the second part because the highest bits could very well not change from one line to the next, something that happens less frequently in the lowest bits.

Color Images

In the case of a color image, the color will be encoded one after the other for each segment (using one or more segment if they have more than 8 bits for each color plane). The order of the segment should be the same as the input pixel.

For example, RGB8888 color images can be encoded in byte order 8-bit Blue, 8-bit Green and 8-bit Red, so first segment part will be the blue part, second segment part will be green part and the last will be the red part.

For example, for RGB101010 color images, the first segment part will be the lowest 8 bits Blue plane pixels, the second will be the 2 bits highest Blue plane pixels. Segment parts 3 and 4 will be for the Green plane, finally parts 5 and 6 will be for the Red plane.

Bayer Images

If it is possible to send Bayer encoded (not decoded in RGB), this could be implemented in multiple different ways.

One method is to treat it as a monochrome image. Of course it would compare green pixels with either blue or red pixels so that could lead to a less reduced size.

One technique comprises calculating the difference from 2 lines above. Then the red pixels would be compared to red pixels, blue pixels to blue pixels, and green pixels to green pixels. Of course, being two lines above is a little worse than one line above, but most of the time it is better to compare with the same color. The other issue is that each segment comprises blue and green pixels, or red and green pixels, leading to a possible use of more bits per pixel for their differences. This may be addressed in extension 3.4. As previously described, the present algorithm, technique, or process may be easily adapted and implemented wither in hardware or software.

Another, more complicated technique, comprises comparing the green pixels to the preceding line, one pixel left or right depending on the pattern green pixel position. And compare the red or blue pixels to two lines above.

Figure 2:
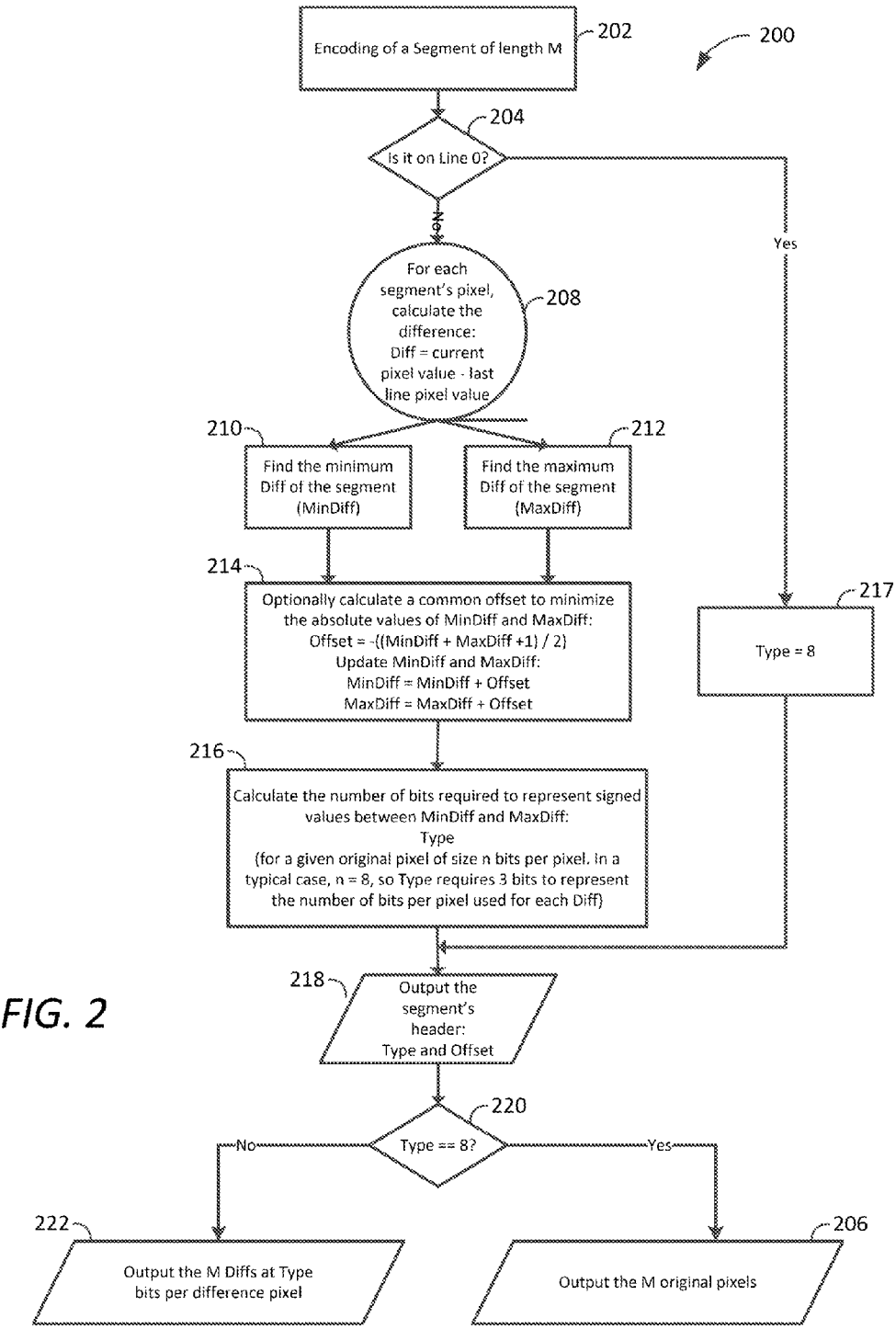
FIG. 2 is a diagram that represents an algorithm or logic function for implementing an image data compression technique according to one embodiment.

Turning now to FIG. 2, which depicts a diagram that represents an algorithm or logic function for implementing an image data compression technique 200 according to one embodiment. The functionality described in connection with the compression technique 200 shown in FIG. 2, may be implemented by the compression module 112 (FIG. 1) either in the form of software or hardware in the form of a digital logic circuit such as a FPGA, or a combination thereof, for example.

With reference now to both FIGS. 1 and 2, in accordance with the illustrated embodiment, the functionality of the compression technique 200 may be implemented in software by the compression module 112. Accordingly, in accordance with the compression technique 200 shown in FIG. 2, the compression module 112 is configured to encode 202 a segment of length M. The compression module determines 204 whether the process is on line 0 and the process continues under different branches based on the results of the determination. For example, according to the illustrated compression technique 200, when the process is on line 0, the process continues along the "yes" branch to set the Type to "8" (217), which will be followed by outputting the header 218 and output 206 the M original pixels.

If the process is not on line 0, for each pixel in the segment the compression module 112 is configured to calculate 208 the difference between the current line and the precedent line as follows:

DIFF=Current Pixel Value−Last Line Pixel Value

The process continues until the DIFF is calculated 208 for each pixel. Subsequently the compression module 112 finds 210 the minimum difference (DIFF) of the segment (MinDiff) and then finds 212 the maximum difference (DIFF) of the segment (MaxDiff).

The compression module 112 is further configured to optionally calculate 214 a common offset to minimize the absolute values of MinDiff and MaxDiff as follows:

Offset=((MinDiff+MaxDif+1)/2)

The MinDiff and MaxDiff are then updated as follows:

MinDiff=MinDiff+Offset

MaxDiff=MaxDiff+Offset

The compression module 112 is further configured to calculate 216 the number of bits required to represent signed values between MinDiff and MaxDiff as a Type for a given original pixel of size N bits per pixel. In a typical example, N=8, so the Type requires 3 bits to represent the number of bits per pixel used for each DIFF. The compression module 112 is configured to output 218 the segment's header Type and Offset. Subsequently, the compression module 112 is configured to determine 220 whether the Type=8. When the Type=8 the process 200 proceeds along "yes" to output 206 the M original pixels. When the Type is not equal to 8, the compression module 112 is configured to output 222 the M DIFFs at Type bits per difference pixel. The compression technique 200 continues until each line segment of the image is encoded.

Figure 3:
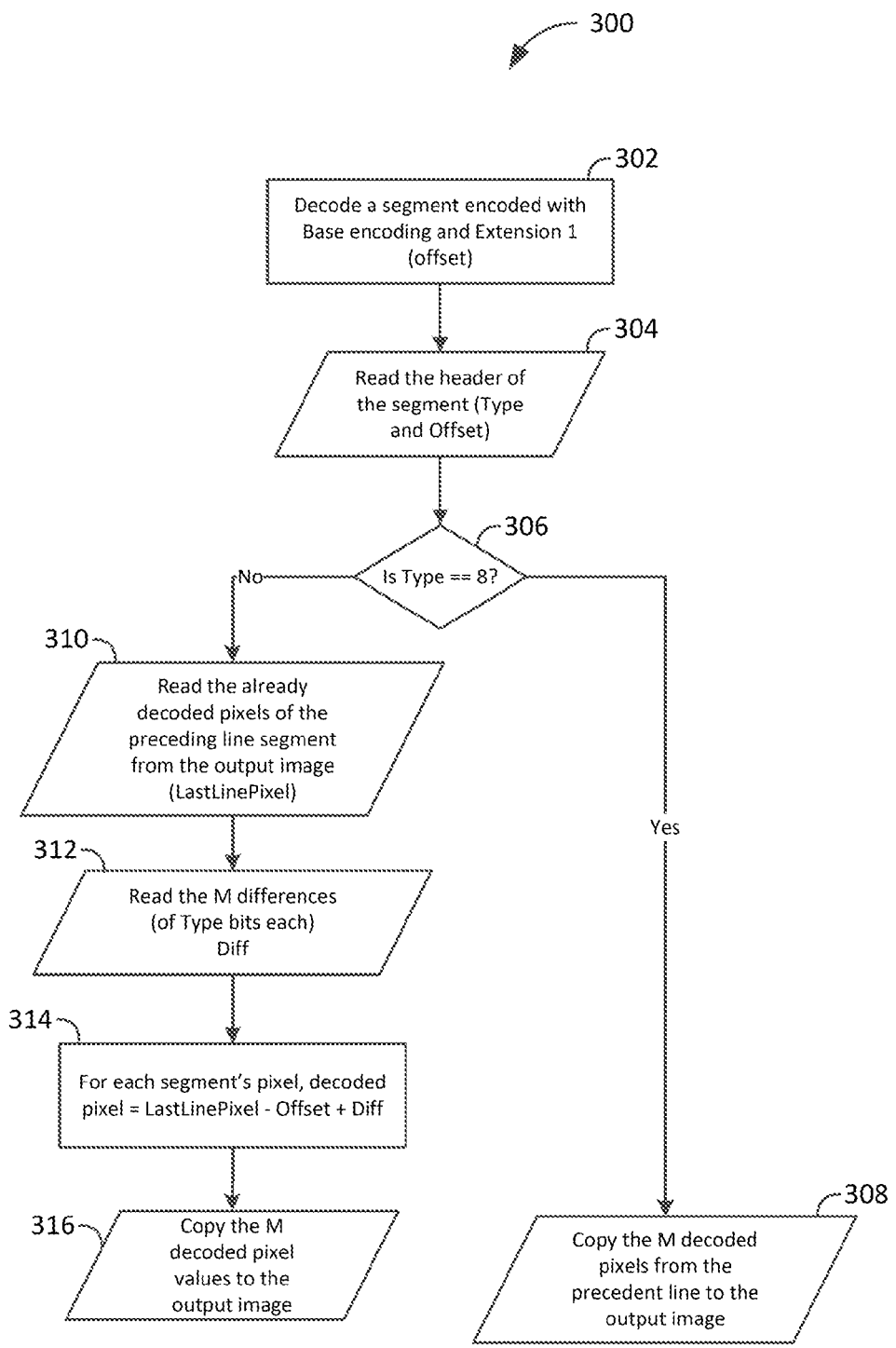
FIG. 3 is a diagram that represents an algorithm or logic function for implementing an image data decompression technique according to one embodiment.

FIG. 3 is a diagram that represents an algorithm or logic function for implementing an image data decompression technique 300 according to one embodiment. The functionality described in connection with the decompression technique 300 shown in FIG. 3, may be implemented by the decompression module 114 (FIG. 1) either in the form of software or hardware in the form of a digital logic circuit such as a FPGA, or a combination thereof, for example.

With reference now to both FIGS. 1 and 3, in accordance with the illustrated embodiment, the functionality of the decompression technique 300 may be implemented in software by the decompression module 114. Accordingly, in accordance with the decompression technique 300 shown in FIG. 3, the decompression module 114 is configured to decode 302 a segment of image data encoded with the Base encoding and Extension 1 (offset), as previously described. The decompression module 114 reads 304 the segment header to obtain segment Type and Offset. The segment Type is then compared 306 to a predetermined number of bits and the process continues under different branches based on the results of the comparison. For example, according to the illustrated decompression technique 300, when the segment Type is equal to "8," the process continues along the "yes" branch to copy 308 the M decoded pixels from the precedent line to the output image.

Alternatively, when the segment is Type is not equal to "8," the process continues along the "no" branch, where the decompression module 114 reads 310 the already decoded pixels of the preceding line segment from the output image (LastLinePixel). The decompression module 114 then reads 312 the M differences (DIFF) of the bits for each segment Type. For each pixel in the segment, the decompression module 114 sets 314 the decoded pixel to the LastLinePixel minus the Offset plus the Diff according to the following expression:

Decoded Pixel=LastLinePixel−Offset+Diff

The decompression module 114 then copies 316 the M decoded pixel value to the output image.

Figure 4:
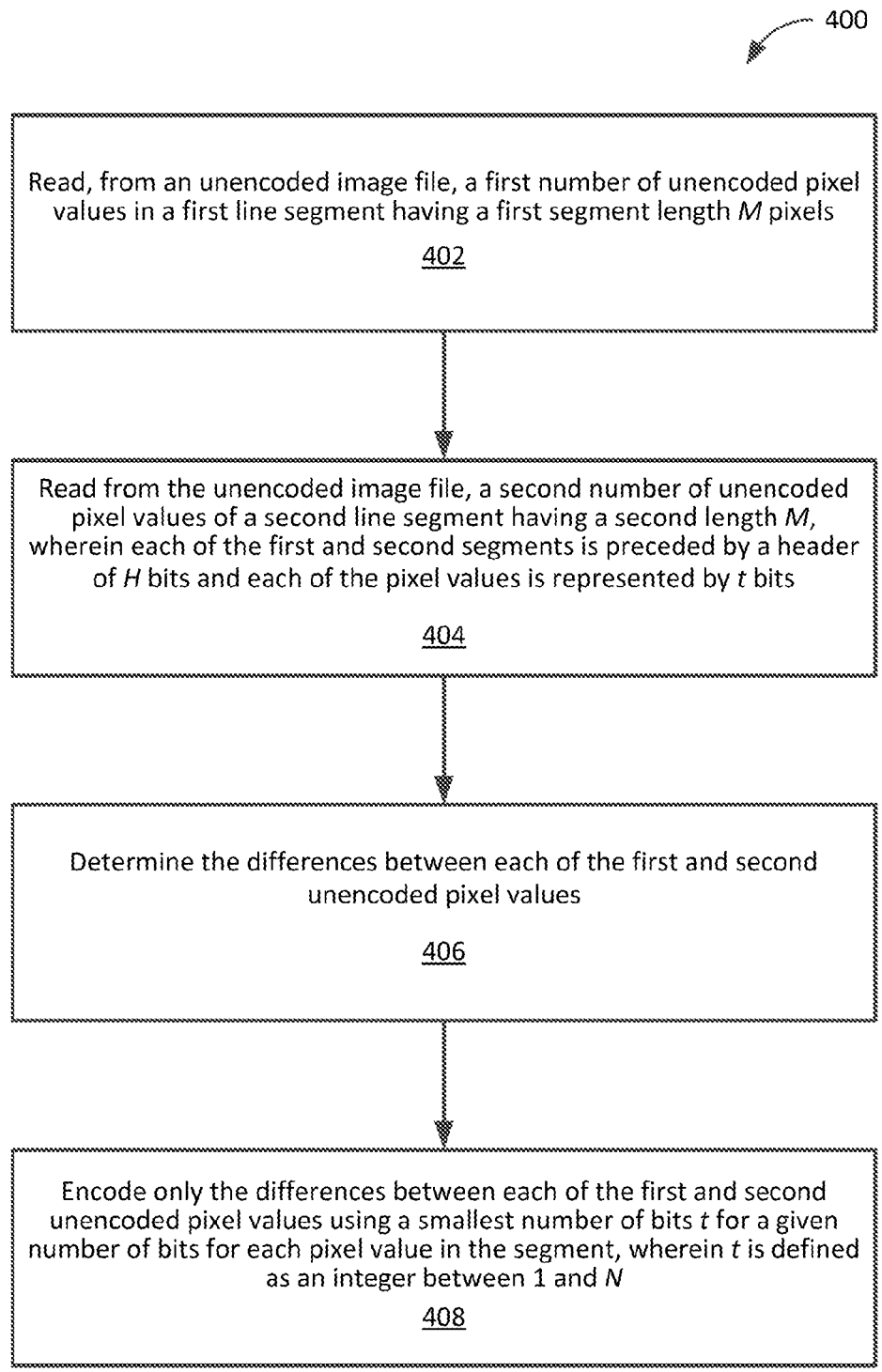
FIG. 4 illustrates a method of compressing a video image file, according to one embodiment.

FIG. 4 illustrates a method 400 of compressing a video image file, according to one embodiment. The image file comprises a plurality of line segments, each line segment having a length of M pixels and a header of H bits, and each pixel is represented by t bits. In one embodiment, the method 400 comprises reading 402, from an unencoded image file, a first number of unencoded pixel values in a first line segment having a first segment length M pixels. The method 400 further comprises reading 404, from the unencoded image file, a second number of unencoded pixel values of a second line segment having a second length M, wherein each of the first and second line segments is preceded by a header of H bits and each of the pixel values is represented by t bits. The method 400 further comprises determining 406 the differences between each of the first and second unencoded pixel values. The method 400 further comprises encoding 408 only the differences between each of the first and second unencoded pixel values using a smallest number of bits t for a given number of bits for each pixel value in the segment, wherein t is defined as an integer between 1 and N.

In one embodiment, the method 400 further comprises assigning a predetermined number of the first lowest bits T of the header H of the second segment to represent the number of bits t required to encode the segment differences between the first and second line segments.

In one embodiment, the method 400 further comprises determining the minimum and the maximum differences between each of the first and second pixel values in the second line segment.

In one embodiment, the method 400 further comprises determining the worst difference values that both fit in a signed number of 1 to (N−1) bits otherwise writing a real value of N bits for each pixel value instead of the differences between each of the first and second pixel values.

In one embodiment, the method 400 further comprises interpreting the first and second pixel values as a signed number.

In one embodiment, the method 400 further comprises truncating the differences between each of the first and second pixel values to N bits.

In one embodiment, the method 400 further comprises outputting the header followed by the differences between each of the first and second pixel values using t bits so the total number of bits used is given by the relationship: H+M*t.

In one embodiment, the method 400 further comprises defining an offset using the remaining E (H−T) bits of the header; and reducing the smallest number of bits t for a given number of bits for each pixel value in the segment.

Figure 5:
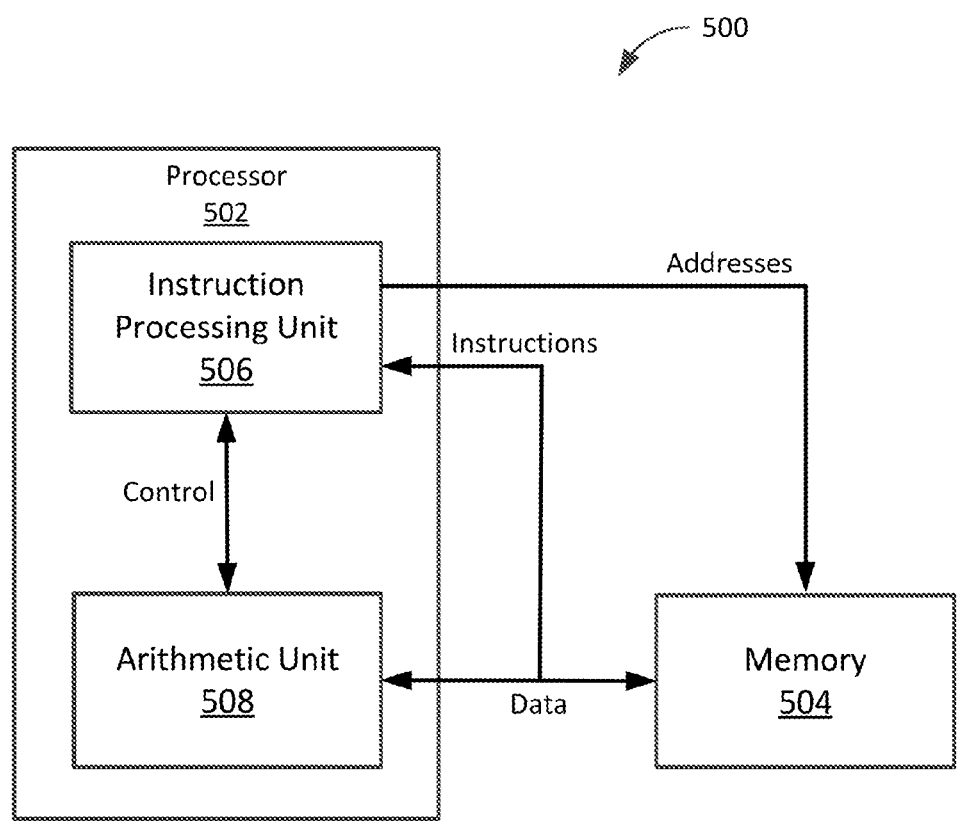
FIG. 5 illustrates a controller configured to compress/decompress image data, according to one embodiment.

In one embodiment, as illustrated in FIG. 5, a circuit 500 may comprise a controller comprising one or more processors 502 (e.g., microprocessor, microcontroller) coupled to at least one memory circuit 504. The at least one memory circuit 404 stores machine executable instructions that when executed by the processor 502, cause the processor 502 to execute machine instructions to implement the compression and decompression techniques 200, 300, 400 described herein.

The processor 502 may be any one of a number of single or multi-core processors known in the art. The memory circuit 504 may comprise volatile and non-volatile storage media. In one embodiment, as illustrated in FIG. 5, the processor 502 may include an instruction processing unit 406 and an arithmetic unit 508. The instruction processing unit may be configured to receive instructions from the one memory circuit 504.

Figure 6:
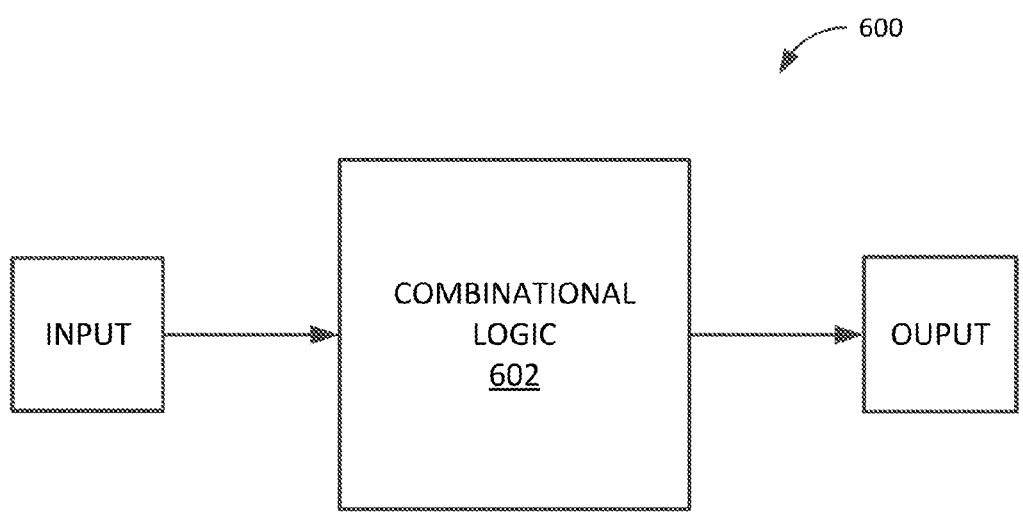
FIG. 6 illustrates a combinational logic circuit configured to compress/decompress image data, according to one embodiment.
Figure 7:
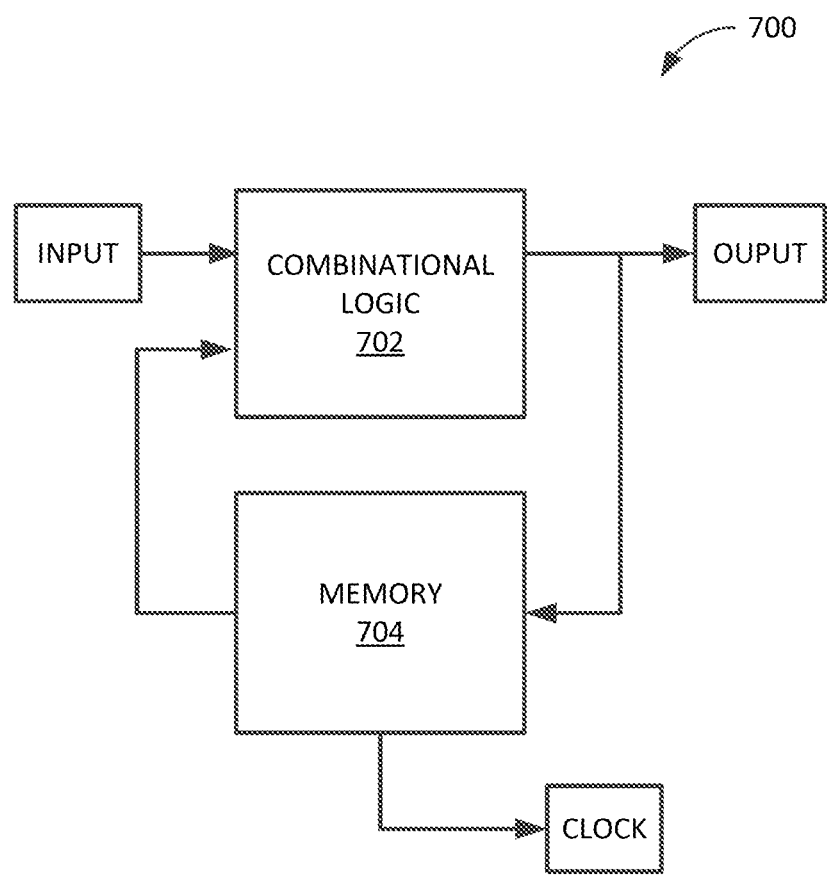
FIG. 7 illustrates a sequential logic circuit configured to compress/decompress image data, according to one embodiment.

In one embodiment, a circuit 600 may comprise a finite state machine comprising a combinational logic circuit 602, as illustrated in FIG. 6, configured to implement the compression and decompression techniques 200, 300, 400 described herein. In one embodiment, a circuit 700 may comprise a finite state machine comprising a sequential logic circuit, as illustrated in FIG. 7. The sequential logic circuit 700 may comprise the combinational logic circuit 702 and at least one memory circuit 704, for example. The at least one memory circuit 704 can store a current state of the finite state machine, as illustrated in FIG. 7. The sequential logic circuit 700 or the combinational logic circuit 702 can be configured to implement the compression and decompression techniques 200, 300, 400 described herein. In certain instances, the sequential logic circuit 700 may be synchronous or asynchronous.

In other embodiments, the circuit may comprise a combination of the processor 502 and the finite state machine to implement the compression and decompression techniques 200, 300, 500 described herein. In other embodiments, the finite state machine may comprise a combination of the combinational logic circuit 600 and the sequential logic circuit 700.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible While various details have been set forth in the foregoing description, it will be appreciated that the various aspects of the image data compression and decompression techniques may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for compressing and decompressing image data, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

A technique for compressing a video image file may be implemented according to the following method:

1. A method of compressing a video image file, the image file comprising a plurality of line segments, each line segment having a length of M pixels and a header of H bits, and each pixel is represented by t bits, the method comprising: reading, from an unencoded image file, a first number of unencoded pixel values in a first line segment having a first segment length M pixels; reading, from the unencoded image file, a second number of unencoded pixel values of a second line segment having a second length M; determining the differences between each of the first and second unencoded pixel values; writing a header of H bits containing Tbits representing value t and E bits for extra information; and encoding only the differences between each of the first and second unencoded pixel values using a smallest number of bits t for a given number of bits for each pixel value in the segment, wherein t is defined as an integer between 1 and N.

2. The method of clause 1, comprising assigning a predetermined number of bits of the header of the current segment to represent the number of bits t required to encode the segment differences between the first and second line segments.

3. The method of clause 2, comprising determining the minimum and the maximum differences between each of the first and second pixel values in the second line segment.

4. The method of clause 3, comprising determining the worst difference values that both fit in a signed number of 1 to (N−1) bits otherwise writing a real value of N bits for each pixel value instead of the differences between each of the first and second pixel values.

5. The method of clause 4, comprising interpreting the first and second pixel values as a signed number.

6. The method of clause 5, comprising truncating the differences between each of the first and second pixel values to N bits.

7. The method of clause 6, comprising outputting the header followed by the differences between each of the first and second pixel values using t bits so the total number of bits used is given by the relationship: H+M*t.

8. The method of clause 1, comprising: defining an offset using the remaining E=H−T bits of the header; and reducing the smallest number of bits t for a given number of bits for each pixel value in the segment.

9. The method of clause 1, comprising: employing the remaining E=H−T bits of the header when the t value is set to "Full Bytes"; and encoding two half-length segments.

10. The method of clause 1, comprising using the last unused header value for other compression schemes.

A technique for encoding a video image file may be implemented according to the following method:

11. A method of encoding an image file having a line segment length M, the line segment comprising a plurality of pixel values, the method comprising: for each pixel value of in a current line segment, calculating a difference between a pixel value in a current line segment and a pixel value in a precedent line segment; determining a minimum difference for the current line segment; determining a maximum difference for the current line segment; calculating a number of bits required to represent signed values between the minimum difference and the maximum difference; and outputting the M differences for the current line segment at the calculated number of bits per difference pixel value.

12. The method of clause 11, comprising calculating a common offset to minimize absolute values of minimum difference and the maximum difference.

13. The method of clause 12, comprising determining the common offset according to the relationship: Offset=−((MinDiff+MaxDiff+1)/2); where MinDiff represents the minimum difference; and where MaxDiff represents the maximum difference.

14. The method of clause 13, further comprising updating the minimum difference and the maximum difference according to the relationship: MinDiff=MinDiff+Offset; and MaxDiff=MaxDiff+Offset.

15. The method of clause 13, comprising outputting a segment header H, where the segment header comprises T bits containing the value of the calculated number of bits required to represent signed values between the minimum difference and the maximum difference and E bits for an offset value.

16. The method of clause 11, further comprising outputting the H header bits followed by the M original pixel values when the line segment has no valid segment to compare against for a difference or when the calculated number of bits required to represent signed values between the minimum difference and the maximum difference is equal to the full number of bits N used to represent the pixel value.

A technique for decoding a video image file may be implemented according to the following method:

17. A method of decoding a line segment of an image file having a line segment encoded with base encoding and offset, the line segment comprising M pixel values, the method comprising: reading a header of a line segment, wherein the segment header comprises a number of bits required to represent signed values of a minimum difference and a maximum difference between a pixel value in a current line segment and a pixel value in a precedent line segment and an offset value.

18. The method of claim 17, comprising: determining a number of bits t required to represent the signed values of a minimum difference and a maximum difference between a pixel value in a current line segment and a pixel value in a precedent line segment is equal to the full number of bits used to represent the pixel value; and outputting the original M pixel values to an output image when the number of bits t is equal to the full number of bits N used to represent the pixel value.

19. The method of claim 17, comprising: reading decoded pixel values of a preceding line segment from an output image; and reading the M differences between the current line segment and the preceding line segment.

20. The method of claim 19, comprising; determining a decoded pixel value for each pixel value of the current line segment according to the relationship: decoded pixel value=LastLinePixel−Offset+Diff; where LastLinePixel is the already decoded pixel value of the preceding line segment from the output image; where Offset is the difference between absolute values of a minimum difference and a maximum difference between pixel values in a current line segment and pixel values in a preceding line segment; and where Diff is the difference between pixel values in a current line segment and pixel values in a preceding line segment; and copying the M decoded pixel values to the output image.

What is claimed is:

1. An apparatus for compressing a video image file, the image file comprising a plurality of line segments, each line segment having a length of M pixels and a header of H bits, and each pixel is represented by t bits, the apparatus comprising a circuit configured to:
    read, from an unencoded image file, a first number of unencoded pixel values in a first line segment having a first segment length M pixels;
    read, from the unencoded image file, a second number of unencoded pixel values of a second line segment having a second segment length of M pixels;
    determine the differences between each of the first and second unencoded pixel values;
    write a header of H bits containing T bits representing value t and E bits for extra information; and
    encode only the differences between each of the first and second unencoded pixel values using a smallest number of bits t required to represent each of the differences, wherein t is defined as an integer between 1 and N.

2. The apparatus of claim 1, wherein the circuit is configured to assign a predetermined number of bits of the header of a current segment to represent the number of bits t required to encode the segment differences between the first and second line segments.

3. The apparatus of claim 2, wherein the circuit is configured to determine the minimum and the maximum differences between each of the first and second pixel values in the second line segment.

4. The apparatus of claim 3, wherein the circuit is configured to determine if the minimum and the maximum differences both fit in a signed number of 1 to (N−1) bits, and if not, then write the unencoded pixel values instead of the differences between each of the first and second pixel values.

5. The apparatus of claim 4, wherein the circuit is configured to interpret the first and second pixel values as a signed number.

6. The apparatus of claim 5, wherein the circuit is configured to truncate the differences between each of the first and second pixel values to N bits.

7. The apparatus of claim 6, wherein the circuit is configured to output the header followed by the differences between each of the first and second pixel values using t bits so the total number of bits used is given by the relationship: H+M*t.

8. The apparatus of claim 1, wherein the circuit is configured to:
    define an offset using the remaining E=H−T bits of the header; and
    reduce the smallest number of bits t required to represent each of the differences.

9. The apparatus of claim 1, wherein the circuit is configured to:
    employ the remaining E=H−T bits of the header when the t value is set to "Full Bytes"; and
    encode two half-length segments.

10. The apparatus of claim 1, wherein the circuit is configured to use the last unused header value for other compression schemes.

11. The apparatus of claim 1, wherein the circuit is implemented on a field programmable gate array (FPGA).

12. The apparatus of claim 1, wherein the circuit is embedded in a machine vision gigabit Ethernet camera.

13. The apparatus of claim 1, wherein the circuit is configured to communicate compressed data over a gigabit Ethernet link.

14. An apparatus for compressing a video image file, the image file comprising a plurality of line segments, each line segment having a length of M pixels and a header of H bits, and each pixel is represented by t bits, the apparatus comprising a circuit configured to:
    read, from an unencoded image file, a first number of unencoded pixel values in a first line segment having a first segment length of M pixels;
    read, from the unencoded image file, a second number of unencoded pixel values of a second line segment having a second segment length of M pixels;
    determine the differences between each of the first and second unencoded pixel values;
    write a header of H bits containing T bits representing value t and E bits for extra information;
    encode only the differences between each of the first and second unencoded pixel values using a smallest number of bits t for a given number of bits for each pixel value in the segment, wherein t is defined as an integer between 1 and N;
    assign a predetermined number of bits of the header of a current segment to represent the number of bits t required to encode the segment differences between the first and second line segments;
    determine the minimum and the maximum differences between each of the first and second pixel values in the second line segment; and
    determine the worst difference values that both fit in a signed number of 1 to (N−1) bits otherwise writing a real value of N bits for each pixel value instead of the differences between each of the first and second pixel values.

15. The apparatus of claim 13, wherein the circuit is configured to interpret the first and second pixel values as a signed number.

16. The apparatus of claim 14, wherein the circuit is configured to truncate the differences between each of the first and second pixel values to N bits.

17. The apparatus of claim 15, wherein the circuit is configured to output the header followed by the differences between each of the first and second pixel values using t bits so the total number of bits used is given by the relationship: $H+M*t$.

* * * * *